United States Patent
Gendre et al.

(10) Patent No.: US 11,184,393 B1
(45) Date of Patent: Nov. 23, 2021

(54) AUTOMATED COLLECTION OF BRANDED TRAINING DATA FOR SECURITY AWARENESS TRAINING

(71) Applicant: Vade Secure Inc., San Francisco, CA (US)

(72) Inventors: Adrien Gendre, Leers (FR); Olivier Lemarié, Sunnyvale, CA (US); Sébastien Goutal, San Francisco, CA (US)

(73) Assignee: VADE SECURE INC., San Francisco, CA (US)

( * ) Notice: Subject to any disclaimer, the term of this patent is extended or adjusted under 35 U.S.C. 154(b) by 0 days.

(21) Appl. No.: 17/060,951

(22) Filed: Oct. 1, 2020

(51) Int. Cl.
| | |
|---|---|
| *H04L 29/06* | (2006.01) |
| *G06F 16/955* | (2019.01) |
| *H04L 12/58* | (2006.01) |
| *G09B 19/00* | (2006.01) |
| *H04L 29/08* | (2006.01) |
| *G06F 16/23* | (2019.01) |

(52) U.S. Cl.
CPC ...... *H04L 63/1483* (2013.01); *G06F 16/2379* (2019.01); *G06F 16/9566* (2019.01); *G09B 19/0053* (2013.01); *H04L 51/08* (2013.01); *H04L 67/02* (2013.01)

(58) Field of Classification Search
CPC ..... H04L 63/1483; H04L 51/08; H04L 67/02; G06B 19/0053
USPC .......................................................... 726/23
See application file for complete search history.

(56) References Cited

U.S. PATENT DOCUMENTS

| | | |
|---|---|---|
| 8,615,807 B1 | 12/2013 | Higbee et al. |
| 9,146,943 B1 | 9/2015 | Thakur et al. |
| (Continued) | | |

FOREIGN PATENT DOCUMENTS

| | | |
|---|---|---|
| WO | 2019010182 A1 | 1/2019 |
| WO | 2020006415 A1 | 1/2020 |
| WO | 2020110109 A1 | 6/2020 |

OTHER PUBLICATIONS

Agari Whitepaper, Business Email Compromise in the Financial Services Industry, © 2019 Agari Data, Inc., 8 pages.
(Continued)

*Primary Examiner* — Wing F Chan
*Assistant Examiner* — Leon Y Tseng
(74) *Attorney, Agent, or Firm* — Young Law Firm, P.C.

(57) ABSTRACT

A method of collecting training data related to a branded phishing URL may comprise retrieving a phishing URL impersonating a brand; fetching a final webpage referenced thereby; determining the main language of the textual content thereof; rendering graphical representation(s) of the final webpage; extracting, from the source of URLs, information including the retrieved phishing URL, a brand, a type and a date associated therewith and storing the extracted information together with the final webpage and the rendered graphical representation(s). A message that contains a URL matching the phishing URL may then be retrieved. The main language of the textual content of the message may be determined and graphical representations thereof rendered. A record may be updated with the message, the main language and the rendered graphical representations, which may be made accessible as training data to train users to recognize phishing websites and messages.

34 Claims, 7 Drawing Sheets

(56) References Cited

U.S. PATENT DOCUMENTS

| | | | |
|---|---|---|---|
| 9,224,117 | B2 | 12/2015 | Chapman |
| 9,344,447 | B2* | 5/2016 | Cohen .................. G06F 16/285 |
| 9,398,047 | B2 | 7/2016 | Goutal |
| 9,667,645 | B1 | 5/2017 | Belani et al. |
| 9,813,454 | B2 | 11/2017 | Sadeh-Koniecpol et al. |
| 9,871,817 | B2 | 1/2018 | Chapman |
| 9,942,249 | B2 | 4/2018 | Gatti |
| 10,469,519 | B2 | 11/2019 | Irimie et al. |
| 10,601,866 | B2* | 3/2020 | Bartik ................. H04L 63/1483 |
| 10,681,077 | B2 | 6/2020 | Kras |
| 10,686,826 | B1 | 6/2020 | Goutal et al. |
| 10,708,297 | B2* | 7/2020 | Woods ..................... H04L 51/12 |
| 10,834,128 | B1* | 11/2020 | Rajagopalan ........... H04L 51/18 |
| 2010/0083383 | A1 | 4/2010 | Adler et al. |
| 2012/0124671 | A1* | 5/2012 | Fritzson .................. H04L 63/14 726/26 |
| 2014/0173726 | A1* | 6/2014 | Varenhorst ............ H04L 63/101 726/22 |
| 2014/0199663 | A1* | 7/2014 | Sadeh-Koniecpol ........................ H04L 63/145 434/118 |
| 2014/0230061 | A1* | 8/2014 | Higbee ............... H04L 63/1466 726/24 |
| 2016/0344758 | A1* | 11/2016 | Cohen ..................... G08B 21/18 |
| 2019/0104154 | A1* | 4/2019 | Kumar ................ H04L 63/1483 |
| 2021/0112089 | A1* | 4/2021 | Goutal .................. G06F 40/263 |

OTHER PUBLICATIONS

Barracuda Datasheet, Barracuda PhishLine Fight phishing with continuous simulation and training, Datasheet • US 1.4 • Copyright 2019 Barracuda Networks, Inc. 2 pages.

Undated Cofense brochure, Responsive Delivery by Cofense PhishMe Send Phishing Simulations When Users Are Active in Their Email Client, 1 page.

Undated Cofense brochure, Turn Targets Into Defenders Cofense Phishme, 1 page.

FireEye All it Takes Is One brochure, (C) 2018 FireEye Inc., 4 pages.

Security IQ by Infosec Institute Comprehensive Security Education, (C) 2017 Infosec Institute, Inc., 2 pages.

Emilee Rader and Rick Wash, Identifying patterns in informal sources of security information, Journal of Cybersecurity, 1(1), 2015, 121-144 doi: 10.1093/cybsec/tyv008 Advance Access Publication Date: Dec. 1, 2015 Research Article, 24 pages.

Lauren Ashley, Knowbe4 Phishing Template Category Glossary, downloaded from &22/(=!!(>//452?@)4:A-B?C4.!&C!-) D>(!152'C0- (!""E$""F"BGH D%&'(&')*D,-./012-D312-*456D704((156 on Aug. 11, 2020, 9 pages.

KNowbe4 Human Error. Conquered, Security Awareness Training and Simulated Phishing Platform, (C) 2018 Knowbe4, Inc., 2 pages.

RFC2822, Internet Message Format, P. Resnick, Editor, QUALCOMM Incorporated, Apr. 2001, 51 pages.

RFC7231, Hypertext Transfer Protocol (HTTP/1.1): Semantics and Content, R. Fielding, Ed., Adobe, J. Reschke, Ed. greenbytes, Jun. 2014, 101 pages.

Sophos, Sophos Phish Threat, Feb. 2019. DSNA (NP), 2 pages.

Trend Micro, Enterprise Network Protection Against Cyberattacks Primer: Business Email Compromise, (C) 2017 Trend Micro, 9 pages.

* cited by examiner

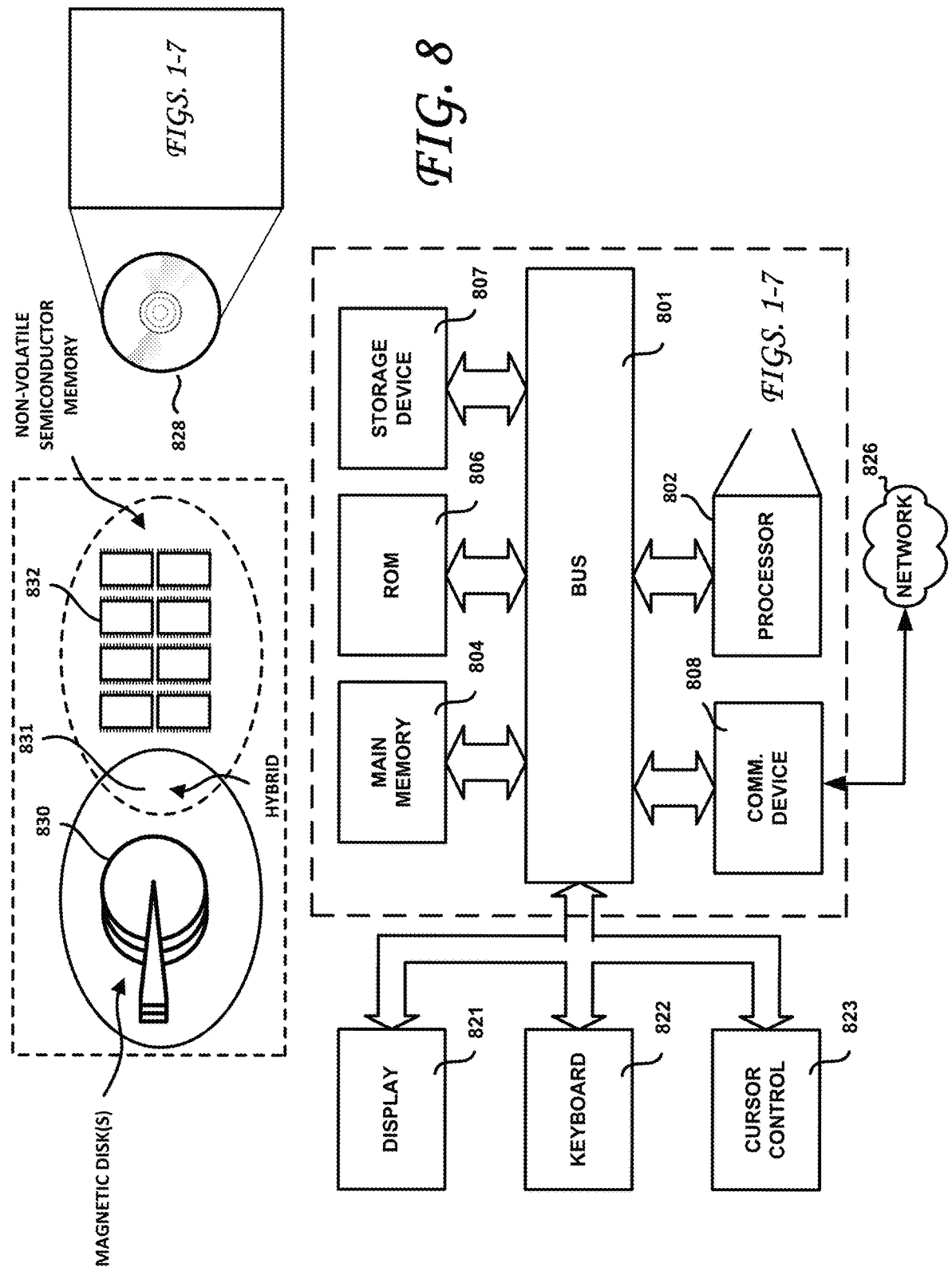

AUTOMATED COLLECTION OF BRANDED TRAINING DATA FOR SECURITY AWARENESS TRAINING

BACKGROUND

There is a global consensus in the cyber security community that end users are the weakest link in an organization's security. Despite the sophistication of existing cyber security solutions in protecting organizations from cyber threats (such as firewalls, antispam, antivirus, intrusion detection system, sandboxing and URL scanning to name a few), there are always cyber threats that are not detected. The end user, therefore, is the de facto last line of defense. Recently, this trend has increased dramatically as cyber criminals now favor targeted cyber-attacks, such as Business Email Compromise, over large-scale attacks such as spam and malware campaigns. Existing cyber security solutions fail to efficiently detect targeted cyber-attacks, thereby exposing the end users to these undetected cyber-attacks. The case of Business Email Compromise, which leverages identity deception and social engineering, is particularly alarming, and many organizations have financially suffered from successful attacks that were not detected by either installed cyber security solutions or by the targeted end user. Phishing is also a major concern, as phishing attacks are becoming increasingly more targeted as the fraudsters' sophistication in evading existing cyber security solutions grows. More generally, as there is no perfect technological response to cyber threats, it falls to end users to make important and consequential security decisions, such as clicking on a potentially harmful link. Therefore, it is now necessary to train end users so that they may become a more powerful and effective last line of defense.

BRIEF DESCRIPTION OF THE DRAWINGS

FIG. 8 is a block diagram of a computing device with which embodiments of the present computer-implemented method for the automated collection of branded training data for security awareness training may be carried out, according to one embodiment.

DETAILED DESCRIPTION

Security Awareness Computer-Based Training

Figure 1:
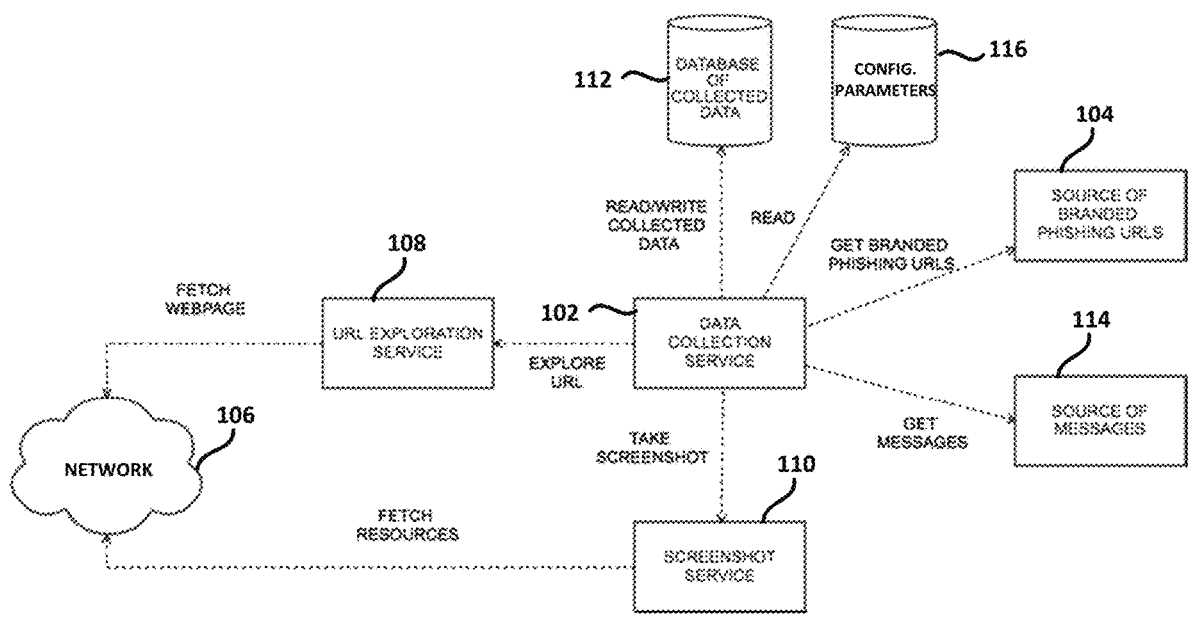
FIG. 1 is a block diagram of a computer system configured for the automated collection of branded training data for security awareness training, according to one embodiment.

This new approach of training the end user is known as security awareness training, and many software vendors have proposed computer-based solutions known as security awareness computer-based training (CBT) solutions.

Security awareness computer-based training can take different forms such as videos, newsletters, quizzes, games, simulations of cyber threats and so on. Simulations of cyber threats provide a very efficient way to train and evaluate the end users, and many security vendors include simulation of cyber threats in their offerings. In particular, many vendors provide simulation of targeted attacks by email (Business Email Compromise, phishing and so on) as email is by far the primary dissemination vector of cyber-attacks.

Security awareness computer-based training involves two different roles:
  A security manager that is in charge of the training for the organization; and
  End users of the organization that are being trained and evaluated.

The process has different steps:
  Customization of the training content by the security manager;
  Training of the end users; and
  Review of the results by the security manager for further actions.

This process may be repeated many times. Indeed, as the cyber threat landscape is dynamic and new cyber threats appear regularly, this end user training must be repeated and updated regularly.

Customization of the Training Content by a Security Manager

As vendors provide a large library of training content, the security manager is charged with selecting and customizing the provided training content so that it fits the organization's training needs. In the case of simulation of cyber threats, vendors provide templates of cyber threats with different selectable and customizable features:
  Vector of the threat: email, webpage, SMS, voice, USB device, etc.;
  Language of the threat: English, German, French, Spanish, etc.;
  Threat related to a specific topic: banking and finance, healthcare, HR, legal, etc.;
  Threat related to a specific event: Christmas, Thanksgiving, etc.;
  Threat related to an end user-specific event such as birthday, work anniversary, etc.;
  Threat containing branded content such as a brand name or a logo. Phishing attacks are most often branded, as they rely on impersonations of well-known brands such as Microsoft, PayPal, Wells Fargo, etc.; and
  Difficulty in identifying the threat, such as easy, moderate or difficult.

Threats templates may also be customized with data pulled from the organization's information system such as Microsoft Active Directory or Lightweight Directory Access Protocol (LDAP) directories. These cyber threats templates are usually based on real cyber threats that are collected over time by the vendors.

Customization is essential as organizations are targeted by different cyber threats. For example, an organization based in United States is likely to be targeted by W-2 form-related fraud during tax season, whereas an organization based outside United States is unlikely to be so targeted, as such a targeted attack is only relevant and attempted in the US. Similarly, an organization based in France is likely to be targeted by phishing emails that are written in French and that impersonate French brands such as French banks including Societe Generale, Credit Agricole, BNP Paribas and the like. Therefore, the organization's French end users would be trained to identify these specific threats. However, there is little need to train the US-based end users for cyber threats that are specifically targeted to French end users.

Organizations also have very specific processes and workflows. Organizations that use services such as Microsoft 365, Salesforce and DocuSign on a daily basis would be well served to train their end users to identify phishing emails impersonating these services. The security manager's role is crucial to ensure that the training content delivered to the end users fits the organization's training needs.

Training of the End Users

The security manager can select the end users that are to receive the training. Some end users, however, are more exposed than others. In particular, employees who have a presence on the organization's website and social media are more likely to be victims of targeted attacks. Furthermore, some end users may be more vulnerable than others. For example, the training of employees having a past history of clicking on malicious links or opening malicious attachments should be prioritized.

There are two ways to deliver the training content to the end users:
 Scheduled training: training that is delivered at specific dates and times, as configured by the security manager;
 Triggered training: training that is delivered upon the occurrence of a specific event.

There are many use cases for triggered training. Here are some examples:
 The end user has failed to identify a cyber threat. For example, the end user may have clicked on a link present in an email that is later identified as being malicious;
 The end user failed to identify a simulated cyber threat. For example, the end user may have clicked on a simulated phishing link present in a simulated phishing email. Alternatively, the end user may have opened a simulated malicious attachment in a simulated malicious email, or the end user may have replied to a simulated fraudulent email;
 The end user is active in his email client software; and
 An event related to the end user happened, such as a birthday or work anniversary.

The training may take different forms such as:
 Simulations: One or several simulated cyber threats may be sent to the end user, and the resulting actions of the end user may be evaluated. Such actions may include opening a simulated phishing email, clicking on a simulated phishing link present in a simulated phishing email, opening a simulated malicious attachment in a simulated malicious email, replying to a simulated fraudulent email, and/or reporting a simulated phishing email as being a phishing;
 Newsletters: Newsletters may be sent to the end user. For example, these newsletters may focus on security best practices;
 Interactive courses: Training content may be presented to the end user, and the end user can interact directly with the provided content;
 Videos: A video may be presented to the end user. For instance, a video may be shown that presents different typologies of cyber threats, such as phishing, CEO fraud or ransomware, and how these cyber threats work; and/or
 Quizzes: A quiz may be presented to the end user that evaluates the end user's ability to recognize, evaluate and react to cyber threats.

Review of the Results

After the training is performed, the security manager can review the results and take further actions. Vendors typically provide analytics and reporting tools that shows the security awareness of each employee, of each team and of the overall organization. If an end user is considered to be at risk, further actions can be taken such as providing additional training sessions and/or disabling functionalities that may be dangerous. For example, attachments or hyperlinks may be removed from emails received by this particular end user. These functionalities may be restored when the end user is no longer considered at risk.

Exemplary Implementation

According to an embodiment, a data structure called CollectedDatum may be defined with one or more the following properties:
 URL: A uniform resource locator (URL) that is the primary identifier of the structure;
 Brand: Brand associated with the URL;
 Type: Type of URL. The type can be Phishing for a phishing URL or Genuine for a genuine URL;
 Date: A date associated with the URL. For a phishing URL, the date may be the first time when the URL was detected or reported as a phishing URL;
 Webpage: Webpage associated with the URL;
 WebpageLanguage: The main language in which the webpage is written;
 Web pageScreenshots: One or several screenshots i.e., graphical renderings of the webpage;
 Message: An electronic message that contains the URL. Such a message may be, for example, an email, a text message (such as SMS and MMS) or an instant message (such as WhatsApp, WeChat and Facebook Messenger) to name a few. Note that in the case of an email, Message may contain email headers such as the From and Subject headers and the email body;
 MessageLanguage: The main language in which the message is written; and
 MessageScreenshots: One or several screenshots i.e., graphical renderings of the message body.

The CollectedDatum data structure may be stored in the database of Collected Data 112 shown in FIG. 1 and may include some or all of these properties and/or other properties not specifically listed herein.

FIG. 1 is a diagram showing an overview of a data collection service according to an embodiment. According to an embodiment, the following configuration parameters may be defined and stored in the database 116 shown in FIG. 1:
 ListOfBrands: List of brands for which data is to be collected. This list may contain brands impersonated by phishing attacks. For example: ListOfBrands={PayPal, Microsoft, Docusign, WellsFargo};
 ListOfLanguages: List of languages for which data is to be collected. For example: ListOfLanguages={English, French, German, Spanish};
 MaxPhishingDataPerBrandAndLanguage: Maximum number of phishing data to collect per brand and language. For example: MaxPhishingDataPerBrandAndLanguage=200;
 BrandedPhishingURLSourcePeriod: Period in seconds for the periodic query of the source of branded phishing URLs. For example, if BrandedPhishingURLSource- Period=300 then the source of branded phishing URLs will be queried every 5 minutes (300 seconds);

Web pageScreenshotRenderingParameters: Rendering parameters to take a screenshot of a webpage. For example, if Web pageScreenshotRenderingParameters={MobilePhone, LaptopComputer} then two rendering will be performed, one rendering for a mobile phone and another one for a laptop computer; and MessageScreenshotRenderingParameters: Rendering parameters to take a screenshot of a message. For example, if MessageScreenshotRenderingParameters= {MobilePhone, LaptopComputer} then two rendering will be performed, one for a mobile phone and another for a laptop computer.

Other configuration parameters may be devised. According to one embodiment, the data collection service 102 reads the configuration parameters stored in the configuration parameter database 116 at initialization time.

Collection of Phishing Data

The collection of phishing data, according to an embodiment, is performed programmatically, as the objective is to collect the most recent of the many phishing attacks that appear every day.

Figure 2:
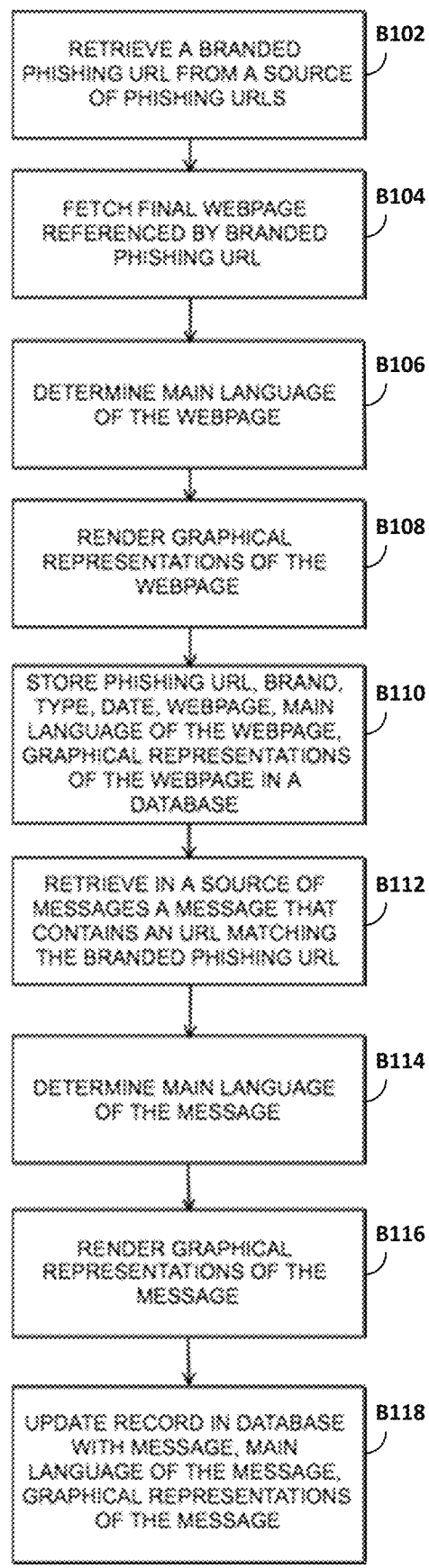
FIG. 2 is a flowchart of a computer-implemented method for the automated collection of branded training data for security awareness training, according to one embodiment.

Periodic query of a source of branded phishing URLs: As shown at B102 in FIG. 2, for each brand present in ListOfBrands, the data collection service 102 may be configured to periodically collect, every BrandedPhishingURL-SourcePeriod seconds, the most recent branded phishing URL(s) from a source of branded phishing URLs 104. The source of branded phishing URLs 104 is a service that publishes phishing URLs over a computer network 106, where each URL is associated with a brand. Note that other metadata may be associated with the URL, such as the first time the URL was detected as phishing. Note also that the source of branded phishing URLs 104 may be an aggregation of several sources of branded phishing URLs. Examples of such services include those at https://isitphishing.ai/ and https://www.phishtank.com/. The following table is an example of branded phishing URLs that were detected on Aug. 10, 2020 at 4:01 (UTC).

TABLE 1

Examples of branded phishing URLs

| URL | Type | Brand | First Detection Date (UTC) |
|---|---|---|---|
| http://verify-account-paypal.xyz/ | Phishing | PayPal | Aug. 10, 2020 4:01:12 |
| http://confirm-login.cf/step1/ | Phishing | PayPal | Aug. 10, 2020 4:01:35 |
| http://www.leonardizz.it/o365/index.html | Phishing | Microsoft | Aug. 10, 2020 4:01:27 |
| http://online-banking.xyz/wells | Phishing | Wells Fargo | Aug. 10, 2020 4:01:49 |

The processing for each URL may include the following:
First, an URL may be discarded by the data collection 102 service if:
 There is no brand associated with the URL;
 The brand associated with the URL is not present in ListOfBrands;
 There are several brands associated with the URL;
 The URL type is not Phishing; and/or
 The URL is already present in the database of collected data.

URLs may be discarded by the data collection service 102 for one or more of the above-listed reasons and/or for other reasons.

If a URL is not discarded, it may be submitted by the data collection service 102 to the URL exploration service 108. The URL exploration service 108 fetches the content associated with this URL, and follows any redirections it encounters, as there may be one or several redirections. A redirection can be performed in different ways including, for example, HTTP 3xx redirection such as HTTP 301 Moved Permanently, HTML meta refresh redirection and/or JavaScript redirection. The final webpage content may then be returned to the data collection service 102, as shown at B104 in FIG. 2. The URL exploration service 108 may fail to retrieve the webpage content (for example HTTP 4xx and HTTP 5xx error codes) and in this case, the URL and associated data may be discarded. The textual content of the webpage returned by the URL exploration service 108 may be extracted and analyzed to determine the main language in which the webpage is written. The main language of the webpage may then be determined, as shown at B106. The webpage may be discarded if the main language cannot be identified or if the main language identified is not present in ListOfLanguages. Then the webpage may be sent to the screenshot service 110 and the screenshot service 110 may render a graphical representation of the webpage according to WebpageScreenshotRenderingParameters, as called for at B108 in FIG. 2. Rendering parameters may include, for instance, the size of the screenshot or the type of display (mobile phone, tablet computer, laptop computer and so on). Note that the screenshot service 110 may connect to the network 106 to retrieve remote resources (Images, CSS, JavaScript scripts and so on).

Finally, as shown at B110, a new CollectedDatum data structure may be stored in the database 112 with one or more of the following (and/or other) exemplary properties set:

URL

Brand

Type: Set to Phishing

Date: Detection date of the phishing URL

Webpage

WebpageLanguage

Web pageScreenshots

Continuous processing of a source of messages: The data collection service 102, according to an embodiment, may be configured to continuously process, over network 106, a source of messages 114, where the messages may be emails, and where the source of messages 114 may be an ISP (Internet Service Provider) email feedback loop or a spamtrap. Note that the source of messages 114 may be an aggregation of several sources of messages. The data collection service 102 may be configured to retrieve such messages as shown at B112 and to parse each retrieved message, to extract URLs therefrom and may try to match these URLs with the collected URLs present in the database 112 and for which no message has been found yet. According to embodiments, the matching carried out by the data collection service 102 may be an exact match or may be an inexact match. Considering now the example of the branded phishing URL http://confirm-login.cf/step1/, table 2 shows some examples of matches:

TABLE 2

Examples of URLs and match results

| URL in message | Result |
| --- | --- |
| http://confirm-login.cf/step1/ | Exact match. |
| http://www.confirm-login.cf/ | Case sensitive matching of top-level domain (TLD) and second level domain (SLD). |
| http://WWW.CONFIRM-LOGIN.CF/step2 | Case insensitive matching of top-level domain (TLD) and second level domain (SLD). |

The above examples are not exhaustive, and the matching algorithm may consider different elements of a URL such as the labels of the domain name, the elements of the URL path, the elements of the query string and the fragment in addition or in place of the above-characteristics. The match of each element may also be case sensitive or case insensitive.

If a message contains a URL that matches (exactly or to a predetermined degree) a URL in the database 112, then the message may be kept. The textual content of the message may be extracted and analyzed to determine the main language in which it is written. The message may be discarded, according to an embodiment, if:

The main language cannot be identified at B114;
The main language is not in ListOfLanguages; and/or
The main language differs from WebpageLanguage.

The message may then be sent to the screenshot service 110 and the screenshot service 110 may then render a graphical representation of the message given the parameters specified in MessageScreenshotRenderingParameters, as called for by block B116. Rendering parameters may include for instance the size of the screenshot or the type of display (Mobile phone, tablet computer, laptop computer and so on). Note that the screenshot service 110 may connect to the network 106 (which may include the Internet) to retrieve remote resources (Images, CSS and so on). Finally, the CollectedDatum in the database 112 may be updated with one or more of the following (and/or other) properties, as suggested at B118 in FIG. 2:

Message;
MessageLanguage; and/or
MessageScreenshots.

As the goal is to provide fresh phishing data, one embodiment only stores a number of URLs specified by MaxPhishingDataPerBrandAndLanguage per brand and language. If the threshold is reached, then oldest entries in the database 112 that can be identified by the Date property may be discarded.

Collection of Genuine Data

The collection of genuine data for ListOfBrands may be performed by using some key technical features such as the domain name. For example, if we consider PayPal, the genuine website is hosted on the paypal.com domain name and genuine emails sent by PayPal contain the paypal.com domain name in the email address of the From header. This domain name was registered on Jul. 15, 1999 and PayPal has used this domain name to communicate with its customers in different languages ever since that date. This domain name has a very high reputation and as such is a very strong and valuable asset of PayPal. It is thus very unlikely that PayPal would use another domain name to communicate with its customers. Similarly, Microsoft uses microsoft.com, which was registered on May 2, 1991 and Wells Fargo uses wellsfargo.com, which was registered on Apr. 28, 1993, to communicate with their respective customers. They too are unlikely to communicate with their customers using any other domain name.

Based on this information, genuine data for each brand and each language may be collected:

By manually fetching the webpage for each brand and each language on the website hosted on the brand domain name. For example, the URL of the PayPal login webpage in the English language is https://www.paypal.com/us/signin, whereas the URL of the PayPal webpage in the French language is https://www.paypal.com/fr/signin.

By collecting genuine messages using a key technical feature. In the specific case where the electronic message in question is an email, genuine emails from the source of emails may be collected by extracting emails that contain the brand domain name in the email address of the From header. For example, genuine PayPal emails may be collected by extracting emails that contain paypal.com in the email address of the From header.

The collection may be performed manually. Indeed, it may be preferable to collect such data manually as brands rarely change the look & feel of their website and communications and as manual collection allows more control on the quality of the data collected. Note that one or several genuine data may be collected per brand and per language.

After the collection of these data, a CollectedDatum data structure may be stored in the database 112 with one or more of the following exemplary properties:

URL
Brand
Type: Set to Genuine
Date: Date of the collection
Webpage
WebpageLanguage
Web pageScreenshots
Message
MessageLanguage
MessageScreenshots Other properties may be used in place of or in addition to the above-listed properties.

Publication of Collected Data

The data collection service 102 may then publish, over network 106, the list of brands, and for each listed brand, the supported languages and the collected data. For example, publication may be carried out using an HTTP-based REpresentational State Transfer (REST) application program interface (API) with JavaScript Object Notation (JSON) format where the client queries the service (e.g., a pull technology). Other publication methods may be used, such as methods leveraging push technologies.

Validation of the Collected Data

Figure 3:
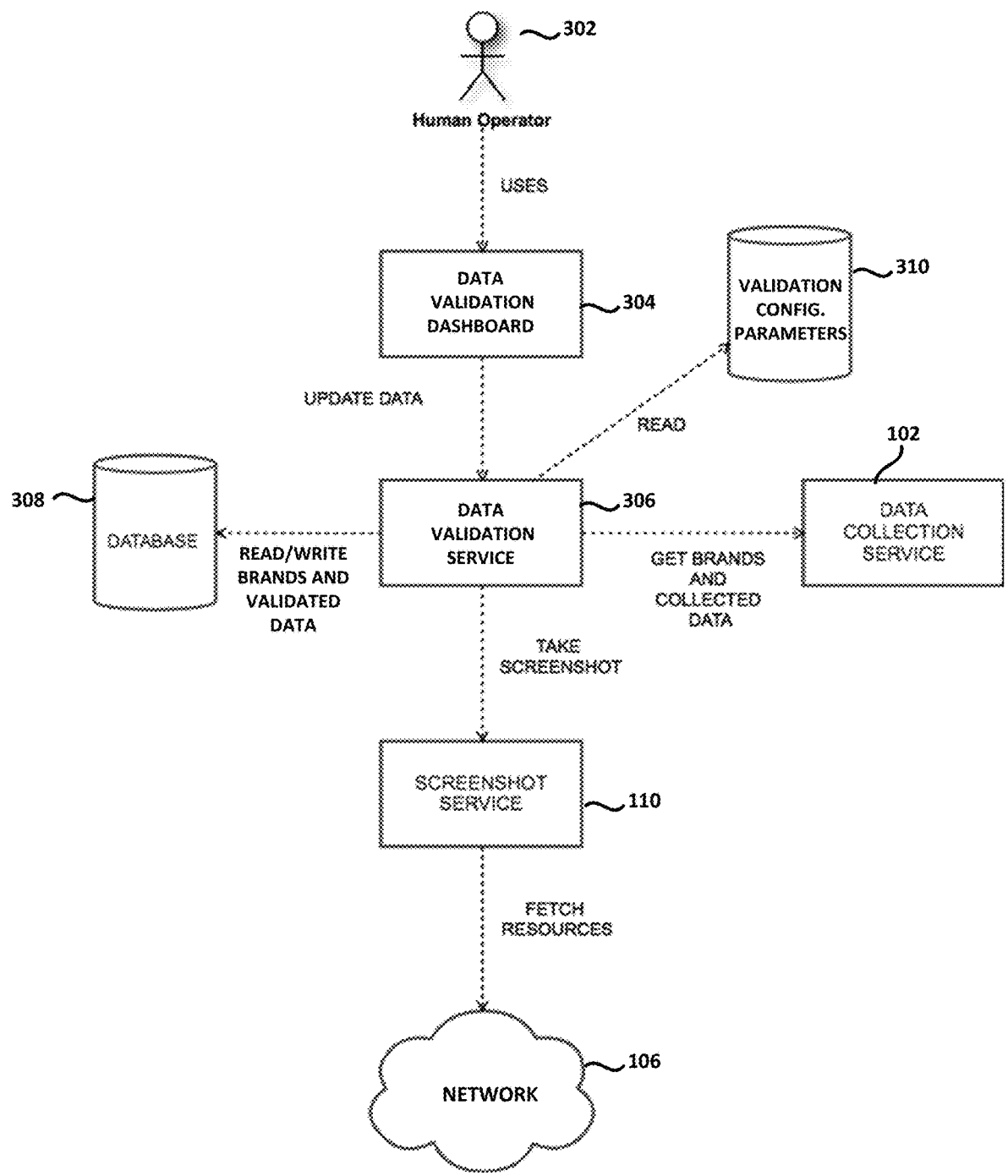
FIG. 3 is a block diagram showing additional aspects of an embodiment.

The data validation service retrieves the list of brands and for each brand, the supported languages from the data collection service. The validation may be performed by a validator. In one embodiment, the validator may be a human operator as shown at 302 in FIG. 3. The validator may also be implemented programmatically, in a system trained using human inputs. The validator 302, however configured, ensures that the training data delivered to the end user meets predetermined quality and legal requirements. For this purpose, the validator may utilize a dashboard 304 to verify the collected data. Note that there may be several validators. For example, there may be a validator who verifies the collected data for a given set of languages, and there may be one or more other validators tasked with validating the collected data for another set of languages. We may define a structure called ValidatedDatum with the following properties:
- URL;
- ValidationStatus: Validation status. The status can be Undefined, Validated or Discarded;
- Brand;
- Type;
- Date;
- Webpage;
- WebpageLanguage;
- Web pageScreenshots;
- Message;
- MessageLanguage; and
- MessageScreenshots.

Properties are the same as the one defined in CollectedDatum, except that ValidationStatus stores the validation status:
- Undefined: Default value i.e. the datum has not been validated yet;
- Validated: Datum has been validated by the validator; and
- Discarded: Datum has been discarded by the validator.

Role of the Validator

A human validator 302 may use a dashboard 304 to verify the collected data. The dashboard 304 may be connected to a data validation service 306. With respect to the quality requirements, the validator (human or software) 302 ensures that the brand association is correct, that the language association is correct and that the quality of the screenshot quality is acceptable. The validator 302 may first ensure that collected the datum is associated with the correct brand. If this is not the case, the validator 302 shall discard the datum (ValidationStatus is set to Discarded) or associate the datum with the actual brand (Brand set to the actual brand). For example, if the datum is associated with PayPal but does not actually contain any branded content, then the datum is discarded. In another example, if the datum is associated with PayPal but the content relates to Microsoft, then the training datum is discarded or associated with Microsoft instead of PayPal. Similarly, the validator 302 may then ensure that the collected datum is associated with the correct language. If this is not the case, the validator 302 shall discard the datum (ValidationStatus set to Discarded) or may associate the datum with the actual language (WebpageLanguage or MessageLanguage set to the actual language). Finally, the validator 302 ensures that the quality of the screenshot is acceptable from an end user point of view. A screenshot of an electronic message or a webpage may not be acceptable for one or more technical reasons including, for example:
- A remote resource (Image, CSS, JavaScript script and so on) is no longer available;
- A remote resource (Image, CSS, JavaScript script and so on) has not been completely loaded;
- Dynamic content (JavaScript script and so on) has not been executed completely; and/or
- Presence of parasite content (Online ads, online notifications and so on) in the screenshot.

If the quality of the screenshot is not acceptable, with additional reference to, for example validation configuration parameters stored in a database 310, the validator 302 shall discard the datum (ValidationStatus set to Discarded). If the quality of the collected data is acceptable, the brands and validated data may be stored in a database 308 from which the data validation service 306 may read and write.

Recall that the datum may also be discarded for legal reasons. Indeed, the validator (human or software-based) 302 may ensure that the collected data does not contain Personally Identifiable Information (PII). In the case where a collected datum contains PII, the validator 302 shall:
- Discard the datum (ValidationStatus set to Discarded)
- Remove the PII and, if necessary, generate associated screenshots with the screenshot service (Message and MessageScreenshots updated, or Webpage and Web pageScreenshots updated). For example, if PII is removed from the Subject header of an email, then it may not be necessary to generate new screenshots of the email. On the other hand, if PII is removed from the body of an email, then it may be necessary to generate new screenshots of the email.
- Replace the PII with generic information—such as replace first name and last name with John Doe or Jane Doe and, if necessary, generate associated screenshots with the screenshot service (Message and MessageScreenshots updated, or Webpage and Web pageScreenshots updated).

Publication of Validated Data

The data validation service 306 may be configured to publish, over a network 106, the list of brands, and for each brand the supported languages, and the validated data. For example, the publication may use an HTTP-based REST API with JSON format where the client queries the service to pull information therefrom. Push notifications may also be implemented.

Training Service

Figure 4:
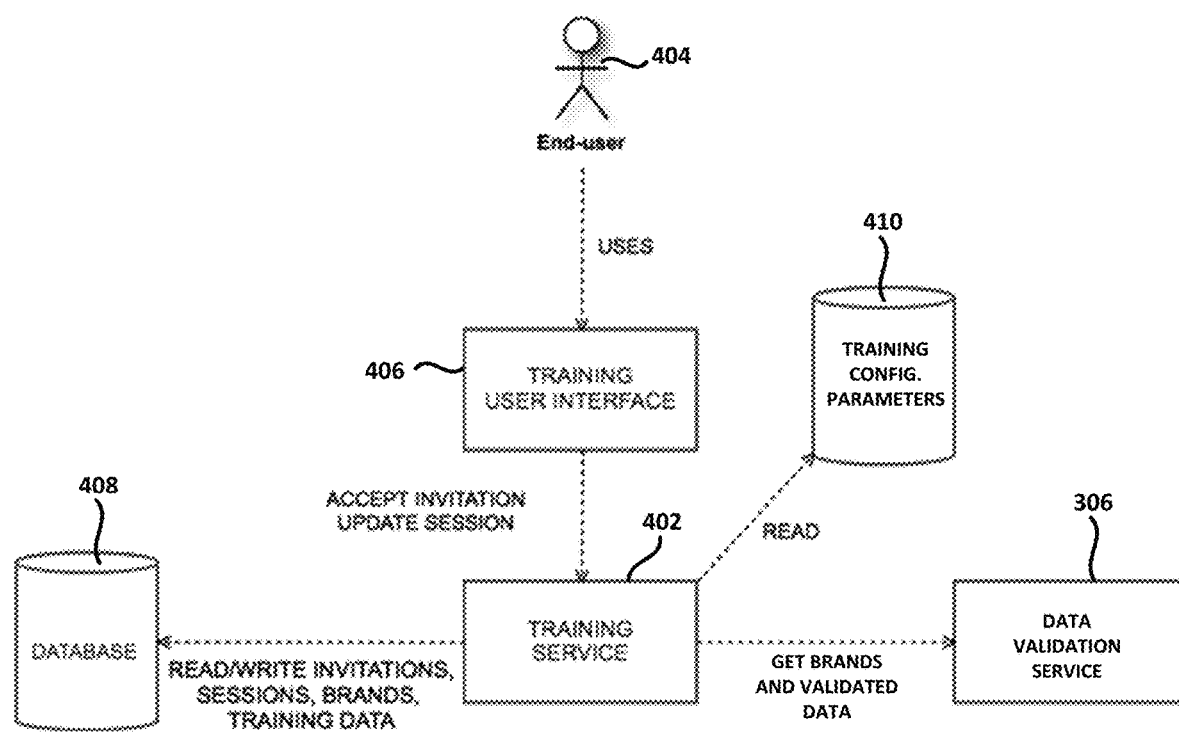
FIG. 4 is a block diagram showing additional aspects of an embodiment.

The training service, shown at 402 in FIG. 4, may be configured, according to one embodiment to invite the end user 404 to a training session and to deliver a training session (detailed hereunder) to the end user 404 if the end user accepts the invitation. The training service 402 may be further configured to retrieve the list of brands and, for each brand, the supported languages and the collected data. As further shown in FIG. 4, the end user 404 may interact with the training service 402 via a training user interface 406 to accept an invitation to a training session and to attend and interact with the training session.

The following configuration parameters may be defined:
- TrainingInvitationTimeout: Period of validity in seconds of an invitation to a training session. For example, if TrainingInvitationTimeout=604800 then an invitation is valid for one week (604800 seconds); and
- TrainingSessionTimeout: Period of validity in seconds of a training session after it has been started by the end user. For example, if TrainingSessionTimeout=3600 then the end user will have one hour (3600 seconds) to complete the training session.

A data structure called Training Invitation may be defined, with one or more of the following (and/or other) properties:
- Type: Set to Phishing;
- Language: Language of the proposed training session;
- Brand: Brand associated with the proposed training session;
- Date: Date of the invitation to the training session;
- End User: Email address of the end user; and
- EndUserDecision may assume one of two states:
  - Undefined: Default value.
  - Accepted: Invitation has been accepted by the end user.

An invitation to a training session extended to an end user may be configured to expire after TrainingInvitationTimeout seconds.

One embodiment defines a data structure called TrainingSession with one or more of the following (and/or other) properties:
- TrainingInvitation: Related training invitation;
- Date: Date of the creation of the training session;

EndUserStartDate: Date when the end user starts the training session;
EndUserFinishDate: Date when the end user finishes the training session;
EndUserResponses: End user responses;
EndUserScore: End user score; and
Content: Content of the training session.

The training session may be configured to expire TrainingSessionTimeout seconds after the end user has started it. TrainingSession are created on the fly each time an invitation to a training session is accepted. The invitations, records of training sessions, brands and other training data may be stored in a databased 408 from which the training service 402 may read and write. Training configuration parameters may be stored in a database 410 from which the training service 402 may read. The databases 112, 308 and 408 may be coupled directly to the data collection service 102, the data validation service 306 and the training service 402, respectively, or may be accessible thereby over a computer network. Similarly, the databases 310 and 410 may be coupled directly to the data validation service 306 and the training service 402, respectively, or may also be accessible thereby over a computer network.

Time of Click Use Case

Consider the case of a phishing email that contains a phishing link leading to a phishing landing page that impersonates PayPal. PayPal is one of the many brands that can be impersonated by phishing attacks. This phishing email is then delivered to an end user's inbox. The URLs present in the email have been rewritten to allow scanning as an additional safety measure when the end user clicks on the link. URL rewriting and URL scanning are known techniques in the context of message security to protect end users against malicious links. The end user then opens the email and clicks on the rewritten phishing URL. The URL scanning service then analyzes the URL and associated landing page, and concludes in this example that the URL leads to a phishing landing page that impersonates PayPal. As a consequence, a training session specific to phishing impersonating PayPal in the English language may then be triggered and delivered to the end user via an intermediate proxy server, as follows:

Step 1: A phishing email containing a phishing URL http://phishing.xyz/login is sent to john.doe@companyinc.com, where John Doe is an employee of a company, and companyinc.com is the domain name associated with the company.

Step 2: The phishing email is received by the company Mail Transfer Agent (MAT). After reception, the phishing email is analyzed to prevent malicious emails from being delivered to the end user by applying, for example, one or more of the following:

Authentication methods, such as DKIM, SPF and DMARC;
A blacklist of IP addresses;
A blacklist of domain names;
An antispam engine;
An antivirus engine; and/or
An email workflow policy.

Step 3: Any URLs present in the phishing email may be rewritten to point to a URL scanning service whose base URL is the exemplary http://urlscanningservice.com. The purpose of using a URL scanning service is to scan the original URL by the URL scanning service when the end user clicks on the rewritten URL.

For example, the phishing URL http://phishing.xyz/login may be replaced by http://urlscanningservice.com/url/ aHR0cDovL3BoaXNoaW5nLnh5ei9sb2dpbg/recipient/ am9obi5kb2VAY29tcGFueWluYy5jb20 where:

http://urlscanningservice.com is the base URL of the URL scanning service;
url is a parameter key;
aHR0cDovL3BoaXNoaW5nLnh5ei9sb2dpbg is a parameter value and results from the encoding in Base64 of http://phishing.xyz/login;
recipient is a parameter key;
am9obi5kb2VAY29tcGFueWluYy5jb20 is a parameter value and results from the encoding in Base64 of john.doe@companyinc.com; and where
the parameters key and value are separated by a forward slash character.

It is to be noted that Base64 is only one of many possible formats into which the parameters values may be encoded in the context of URL rewriting. The parameters values may also be encrypted.

Step 4: The phishing email with the rewritten URLs is delivered to the end user's inbox.

Step 5: The end user accesses his or her inbox. Thinking that the phishing email is a genuine and benign email, he or she opens the phishing email and clicks on the rewritten phishing URL http://urlscanningservice.com/url/ aHR0cDovL3BoaXNoaW5nLnh5ei9sb2dpbg/recipient/ am9obi5kb2VAY29tcGFueWluYy5jb20.

Step 6: The intermediate proxy server receives the request generated as a result of the end user clicking on the rewritten phishing URL. The proxy server extracts the HTTP Accept-Language header of the request. In this example, the header of the end user request contains en-US,en; q=0.9,fr; q=0.8, meaning that the end user preferred language is English. The proxy server then decodes the recipient parameter value i.e. john.doe@companyinc.com. The proxy server also strips the recipient parameter key and value from the URL. The URL http://urlscanningservice.com/url/ aHR0cDovL3BoaXNoaW5nLnh5ei9sb2dpbg is transmitted to the URL scanning service.

Step 7: The URL scanning service receives the request and decodes the original URL i.e. http://phishing.xyz/login. The URL scanning service then fetches the content associated with this URL, and may follow any redirections it encounters, as there may be one or several redirections. A redirection can be performed in different ways (HTTP 3xx redirection such as HTTP 301 Moved Permanently, HTML meta refresh redirection, JavaScript redirection). Finally, the landing page is analyzed and identified as a phishing impersonating PayPal. For example, the body of the URL scanning service response to the request may be formatted in JSON and may contain the following content:

{
"url": "http://phishing.xyz/login",
"status": "phishing",
"brands": ["paypal"]
}

Step 8: The intermediate proxy server receives the response from the URL scanning service and analyzes it. The proxy server requests the training service 402 to generate an invitation to a training session with, according to one embodiment, the following parameters:

Brand: PayPal;
Language: English; and
End user: john.doe@companyinc.com.

The end user is redirected to a webpage that extends an invitation to a training session. Other methods of delivering the invitation to the training session may be used. At this point, the end user can choose to accept or ignore the invitation to the training session.

Step 9: The end user accepts the invitation to the training session by clicking on the appropriate link. The end user is then redirected to the training session.

Training Session

The content of the training session preferably relates to the threat that triggered it. In the example being developed herein, the training session was triggered by the receipt of a phishing email impersonating PayPal in the English language.

The screenshots used for the training depend on the device used by the end user. In this example, it is assumed that the end user is using a laptop computer and that the training session, therefore, is configured using screenshots for a laptop computer. In this implementation, there are two training metrics that are evaluated:

Score: The score is an integer number between 0 and 3. The score is initially set to 0 and is increased at every step if and only if the end user identifies correctly the threat and does not make any mistake.

Time: The time is the number of minutes and seconds spent to complete the training. The score is initially set to 00:00.

Other metrics may be used.

Figure 5:
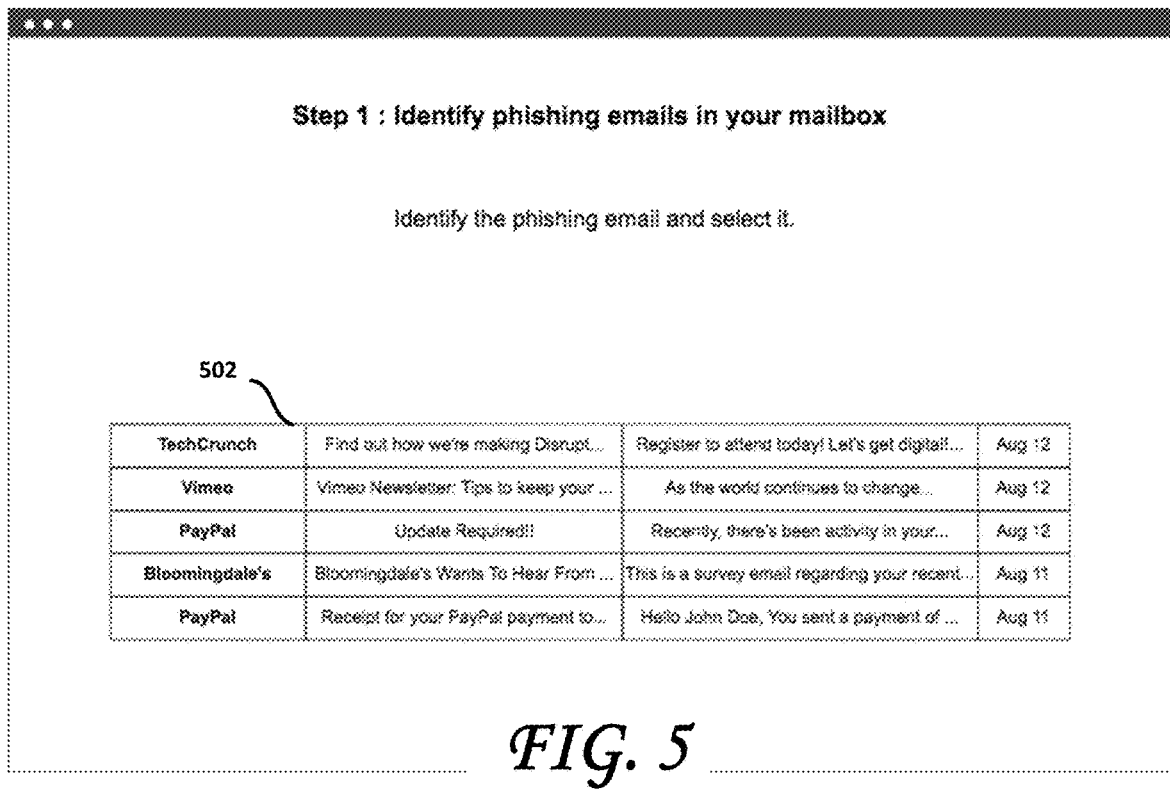
FIG. 5 shows an example of security awareness computer-based training in which the user is tasked with identifying the phishing email in the user's mailbox, according to one embodiment.

This exemplary training session comprises three steps:

Step 1: The goal of the end user is to identify a phishing email in his inbox. A typical inbox view is presented to the end user. As shown in FIG. 5, an exemplary inbox 502 is presented to the user that contains five emails. In this example, the following information may be displayed for each email:

From header display name;
Subject header;
First words of the email body; and
Date Among the training emails shown in FIG. 5, one email is a genuine email sent by the considered brand and written in the considered language, one email is a phishing email impersonating the considered brand and written in the considered language and the other emails are benign emails written in the considered language. The order of the emails can vary; i.e., emails can be in any position in the inbox view.

In FIG. 5, a phishing email impersonating PayPal and written in English is present in the third row of the inbox view 502 and a genuine email sent by PayPal and written in English is present in the last row of the inbox view. The goal of the end user is to identify and select the phishing email. If the end user selects the phishing email, a congratulatory message may be displayed and the end user may be allowed to proceed to step 2. Otherwise, if the end user selects another email, then an error message may be displayed and the end user may be prevented from proceeding to step 2 until he or she has selected the phishing email. The end user's score may be increased if he or she correctly selects the phishing email without making any mistake beforehand. Other scoring criteria may be used.

Step 2: The goal of the end user is to identify and report a phishing email. Two emails may be presented to the end user; namely, genuine email sent by the considered brand and written in the considered language and a phishing email impersonating the considered brand and written in the considered language. The order of the emails may vary from training session to training sessions. For each email the following information may be displayed:

From header display name and email address;
Subject header;
Date; and
Screenshot of the email body.

Figure 6:
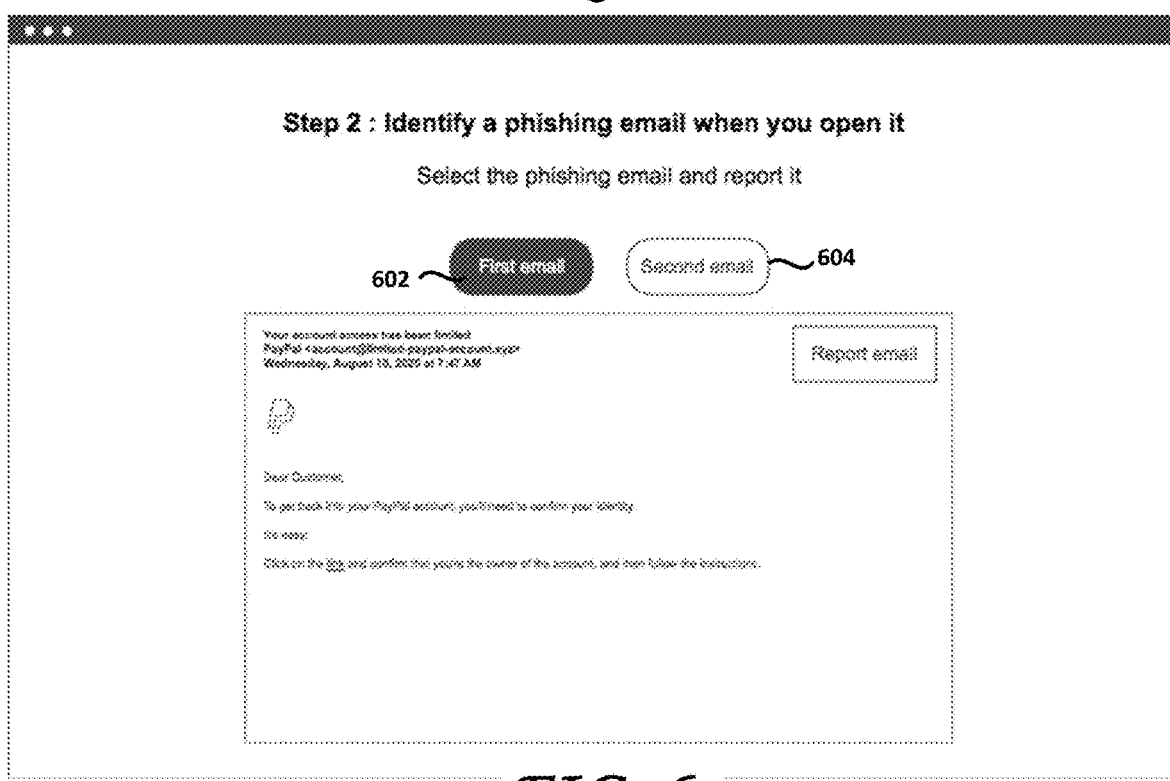
FIG. 6 shows an example of security awareness computer-based training in which the user is tasked with identifying the phishing email after having opened it, according to one embodiment.

As an example, consider FIG. 6, where the selected first email 602 (shown) is a phishing email impersonating PayPal and is written in English and where the non-selected second email 604 (not shown in this view) is a genuine email sent by PayPal and also written in English. The emails presented in Step 2 preferably differ from those presented in Step 1. The end user's goal, in this case, is to identify and report the phishing email. If the end user reports the phishing email, then a congratulatory message may be displayed, the score is increased and the end user may proceed to step 3. Otherwise, if the end user reports the genuine email as being fraudulent, then an error message may be displayed. In that case, the end user may be presented with other emails in an effort to develop his or her ability to spot potentially deceptive messages or the end user may be allowed to proceed to step 3.

Figure 7:
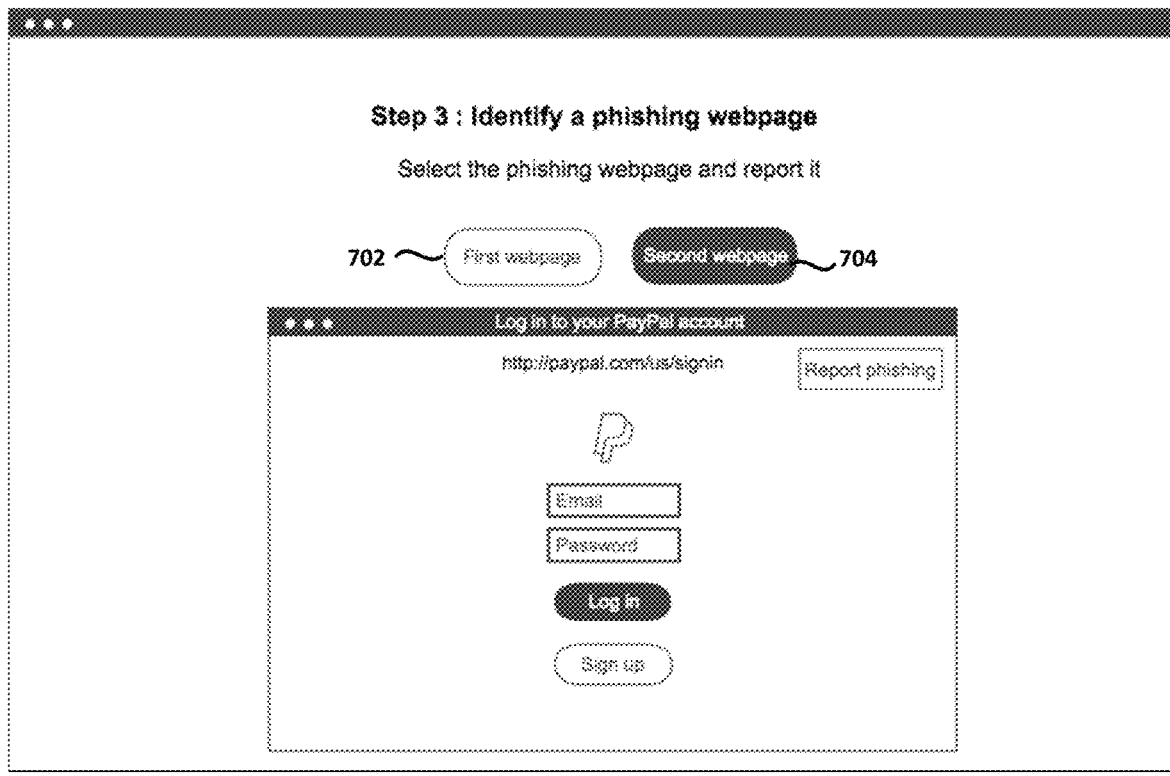
FIG. 7 shows an example of security awareness computer-based training in which the user is tasked with identifying a phishing webpage, according to one embodiment.

Step 3: In this step, the goal of the end user is to identify and report a phishing webpage. As shown in FIG. 7, two webpages (a first webpage 702 and a second webpage 704) may be presented to the end user: a genuine webpage of the considered brand and written in the considered language and a phishing webpage impersonating the considered brand and written in the considered language. Again, the order in which these webpages are presented to the end user may vary. For each webpage, the URL and a screenshot of the webpage may be provided.

In FIG. 7, the first, non-selected, webpage 702 (not shown in FIG. 7) is a phishing webpage impersonating PayPal and written in English and the second, selected, webpage 704 is the genuine PayPal login webpage in English, as shown in FIG. 7. The end user's goal, in this instance, is to identify and report the phishing webpage. If the end user reports the first webpage 702 as being the phishing webpage, then a congratulatory message may be displayed, the score is increased and the end user may be permitted to review the results. If, however, the end user reports the second webpage 704 as being a phishing webpage, then an error message may be displayed and the end user may be allowed or required to review of the results of the training. The results of the training may include, according to one embodiment, the end user's score, time to completion and a summary of the training.

Physical Hardware

FIG. 8 illustrates a block diagram of a computing device with which embodiments may be implemented. The computing device of FIG. 8 may include a bus 801 or other communication mechanism for communicating information, and one or more processors 802 coupled with bus 801 for processing information. The computing device may further comprise a random-access memory (RAM) or other dynamic storage device 804 (referred to as main memory), coupled to bus 801 for storing information and instructions to be executed by processor(s) 802. Main memory (tangible and non-transitory, which terms, herein, exclude signals per se and waveforms) 804 also may be used for storing temporary variables or other intermediate information during execution of instructions by processor 802. The computing device of FIG. 8 may also include a read only memory (ROM) and/or other static storage device 806 coupled to bus 801 for storing static information and instructions for processor(s) 802. A data storage device 807, such as a magnetic disk and/or solid-state data storage device may be coupled to bus 801 for storing information and instructions—such as would be required to carry out the functionality shown and disclosed relative to FIGS. 1-7. The computing device may also be coupled via the bus 801 to a display device 821 for displaying information to a computer user. An alphanumeric input device 822, including alphanumeric and other keys, may be coupled to bus 801 for communicating information and command selections to processor(s) 802. Another type of user input device is cursor control 823, such as a mouse, a trackball, or cursor direction keys for communicating direction information and command selections to processor(s) 802 and for controlling cursor movement on display 821. The computing device of FIG. 8 may be coupled, via a communication interface (e.g., modem, network interface card or NIC) 808 to the network 826.

As shown, the storage device 807 may include direct access data storage devices such as magnetic disks 830, non-volatile semiconductor memories (EEPROM, Flash, etc.) 832, a hybrid data storage device comprising both magnetic disks and non-volatile semiconductor memories, as suggested at 831. References 804, 806 and 807 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over the network 826. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 828. For example, reference 828 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 828 may be embodied as an encrypted solid-state drive. Other implementations are possible. Embodiments of the present invention are related to the use of computing devices for automated collection of branded training data for security awareness training, as shown and described herein. According to one embodiment, the methods, devices and systems described herein may be provided by one or more computing devices in response to processor(s) 802 executing sequences of instructions, embodying aspects of the computer-implemented methods shown and described herein, contained in memory 804. Such instructions may be read into memory 804 from another computer-readable medium, such as data storage device 807 or another (optical, magnetic, etc.) data carrier, such as shown at 828. Execution of the sequences of instructions contained in memory 804 causes processor(s) 802 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor. Accordingly, one embodiment is a computer-implemented method of collecting training data related to a branded phishing Uniform Resource Locator (URL), and may comprise retrieving, over a computer network, a phishing URL impersonating a brand from a source of URLs; fetching a final webpage referenced by the retrieved phishing URL; determining a main language of a textual content of the fetched final webpage; rendering at least one graphical representation of the fetched final webpage and extracting, from the source of URLs, information including the retrieved phishing URL, a brand associated with the retrieved phishing URL, a type associated with the retrieved phishing URL, a date associated with the retrieved phishing URL and storing the extracted information in a database over the computer network, together with the fetched final webpage, a determined main language of the fetched final webpage, and the rendered at least one graphical representations of the fetched final webpage. A message that contains a URL matching the retrieved phishing URL may then be retrieved from a source of messages. The main language of a textual content of the retrieved message may then be determined, and one or more graphical representations of the retrieved message may be rendered. A record in a database may then be updated with the message, the determined main language of the message, and the at least one rendered graphical representation of the message. Then, the stored extracted information and the updated record may be made accessible over the computer network at least as training data to train end users to recognize phishing websites and phishing messages.

According to further embodiments, the fetched final webpage may comprise following at least one redirection leading to the final webpage. The redirection(s) may comprise an HTTP status code 3xx redirection, an HTML meta refresh redirection and/or a JavaScript redirection. The graphical representations of the fetched final webpage may comprise metadata associated with the fetched final webpage and the metadata may comprise a phishing URL. The graphical representations of the fetched final webpage may comprise a graphical representation of the fetched final webpage on a mobile device, a graphical representation of the fetched final webpage on a tablet computer, a graphical representation of the fetched final webpage on a laptop computer and/or a graphical representation of the fetched final webpage on a desktop computer. Each of the graphical representations of the fetched final webpage may comprise a predetermined width and height.

The retrieved message may comprise, for example, an email, a text message and/or an instant message. The method may further comprise parsing, decoding, decompressing and decrypting the content of the retrieved message. The matching of a URL retrieved from the source of messages with the retrieved phishing URL may require an exact match. Alternatively, the matching of a URL retrieved from the source of messages with the retrieved phishing URL may require fewer than all URL elements to match. The URL elements may comprise a label of the domain name, an element of the path, an element of the query string and/or the fragment. The matching of URL elements of a URL retrieved from the source of messages with the retrieved phishing URL may be case sensitive or case insensitive. The graphical representations of the retrieved message may comprise metadata associated with the retrieved message. The metadata of the retrieved message may comprise a sender of the message, a date when the message was sent and/or a subject of the retrieved message. The graphical representations of the retrieved message may comprise a graphical representation of the retrieved message on a mobile device, a graphical representation of the retrieved message on a tablet computer, a graphical representation of the retrieved message on a laptop computer and/or a graphical representation of the retrieved message on a desktop computer. Each of the graphical representations of the retrieved message may comprise a predetermined width and height.

Another embodiment is a computing device configured to collect training data related to a branded phishing Uniform Resource Locator (URL). The computing device may include at least one processor; at least one data storage device coupled to the at least one processor; a network interface coupled to the at least one processor and to a computer network and a plurality of processes spawned by the at least one processor, the processes including processing logic for: retrieving, over a computer network, a phishing URL impersonating a brand from a source of URLs; fetching a final webpage referenced by the retrieved phishing URL; determining a main language of a textual content of the fetched final webpage; rendering one or more graphical representations of the fetched final webpage; extracting, from the source of URLs, information including the retrieved phishing URL, a brand associated with the retrieved phishing URL, a type associated with the retrieved phishing URL, a date associated with the retrieved phishing URL and storing the extracted information in a database over the computer network, together with the fetched final webpage, a determined main language of the fetched final webpage, and the rendered at least one graphical representations of the fetched final webpage. The processes may further comprise processing logic for retrieving, from a source of messages, a message that contains a URL matching the retrieved phishing URL; determining a main language of a textual content of the retrieved message; rendering at least one graphical representation of the retrieved message; updating a record in a database with the message, the main language of the message, and the at least one rendered graphical representation of the retrieved message; and making the stored extracted information and the updated record accessible over the computer network at least as training data to train end users to recognize phishing websites and phishing messages.

According to further embodiments, the processing logic for fetching the final webpage may comprise processing logic to follow at least one redirection leading to the final webpage. The redirection(s) may comprise an HTTP status code 3xx redirection, an HTML meta refresh redirection and/or a JavaScript redirection, for example. One or more graphical representations of the fetched final webpage may comprise metadata associated with the fetched final webpage and the metadata may comprise a phishing URL. The graphical representations of the fetched final webpage may comprise a graphical representation of the fetched final webpage on a mobile device, a graphical representation of the fetched final webpage on a tablet computer, a graphical representation of the fetched final webpage on a laptop computer and/or a graphical representation of the fetched final webpage on a desktop computer. Each of the graphical representations of the fetched final webpage may comprise a predetermined width and height.

The retrieved message may comprise one of an email, a text message and an instant message, for example. The processes may further comprise processing logic to parse, decode, decompress and decrypt a content of the retrieved message. The processing logic for matching a URL retrieved from the source of messages with the retrieved phishing URL may be configured to require an exact match. Alternatively, the processing logic for matching a URL retrieved from the source of messages with the retrieved phishing URL may allow for fewer than all URL elements to match. The URL elements may comprise a label of the domain name, an element of the path, an element of the query string and/or the fragment. The processing logic for matching of the URL retrieved from the source of messages and the retrieved phishing URL may be configured to be case sensitive or case insensitive. The graphical representations of the retrieved message may comprise metadata associated with the retrieved message. The metadata of the retrieved message may comprise a sender of the message, a date when the message was sent and/or a subject of the retrieved message. The graphical representations of the retrieved message may comprise a graphical representation of the retrieved message on a mobile device, a graphical representation of the retrieved message on a tablet computer, a graphical representation of the retrieved message on a laptop computer and/or a graphical representation of the retrieved message on a desktop computer. Each of the graphical representations of the retrieved message may comprise a predetermined width and height.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of and benefits to be derived from computing devices by providing computer-implemented methods of collecting training data related to a branded phishing Uniform Resource Locator (URL), Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of collecting training data related to a branded phishing Uniform Resource Locator (URL), comprising:
    retrieving, over a computer network, a phishing URL impersonating a brand from a source of URLs;
    fetching a final webpage referenced by the retrieved phishing URL;
    determining a main language of a textual content of the fetched final webpage;
    rendering at least one graphical representation of the fetched final webpage,
    extracting, from the source of URLs, information including the retrieved phishing URL, a brand associated with the retrieved phishing URL, a type associated with the retrieved phishing URL, a date associated with the retrieved phishing URL and storing the extracted information in a database over the computer network, together with the fetched final webpage, a determined main language of the fetched final webpage, and the rendered at least one graphical representations of the fetched final webpage;
    retrieving, from a source of messages, a message that contains a URL matching the retrieved phishing URL;
    determining a main language of a textual content of the retrieved message;
    rendering at least one graphical representation of the retrieved message;
    updating a record in a database with the message, the determined main language of the message, and the at least one rendered graphical representation of the message; and
    making the stored extracted information and the updated record accessible over the computer network at least as training data to train end users to recognize phishing websites and phishing messages.

2. The computer-implemented method of claim 1, wherein fetching the final webpage comprises following at least one redirection leading to the final webpage.

3. The computer-implemented method of claim 2, wherein the at least one redirection comprises at least one of an HTTP status code 3xx redirection, an HTML meta refresh redirection and a programming language redirection.

4. The computer-implemented method of claim 1, wherein the graphical representations of the fetched final webpage comprise metadata associated with the fetched final webpage.

5. The computer-implemented method of claim 4, wherein the metadata comprises a phishing URL.

6. The computer-implemented method of claim 1, wherein the graphical representations of the fetched final webpage comprise at least some of a graphical representation of the fetched final webpage on a mobile device, a graphical representation of the fetched final webpage on a tablet computer, a graphical representation of the fetched final webpage on a laptop computer and a graphical representation of the fetched final webpage on a desktop computer.

7. The computer-implemented method of claim 1, wherein each of the graphical representations of the fetched final webpage comprise a predetermined width and height.

8. The computer-implemented method of claim 1, wherein the retrieved message comprises one of an email, a text message and an instant message.

9. The computer-implemented method of claim 1, further comprising at least one of prior parsing, decoding, decompressing and decrypting a content of the retrieved message.

10. The computer-implemented method of claim 1, wherein the matching of the URL retrieved from the source of messages with the retrieved phishing URL requires an exact match.

11. The computer-implemented method of claim 1, wherein the matching of the URL retrieved from the source of messages with the retrieved phishing URL requires fewer than all URL elements to match.

12. The computer-implemented method of claim 11, wherein the URL elements comprise at least one of a label of the domain name, an element of the path, an element of the query string and the fragment.

13. The computer-implemented method of claim 11, wherein the matching of URL elements of the URL retrieved from the source of messages with the retrieved phishing URL is one of case sensitive and case insensitive.

14. The computer-implemented method of claim 1, wherein the graphical representations of the retrieved message comprise metadata associated with the retrieved message.

15. The computer-implemented method of claim 14, wherein the metadata of the retrieved message comprises at least one of a sender of the message, a date when the message was sent and a subject of the retrieved message.

16. The computer-implemented method of claim 1, wherein the graphical representations of the retrieved message comprise at least some of: a graphical representation of the retrieved message on a mobile device, a graphical representation of the retrieved message on a tablet computer, a graphical representation of the retrieved message on a laptop computer and a graphical representation of the retrieved message on a desktop computer.

17. The computer-implemented method of claim 1, wherein each of the graphical representations of the retrieved message comprises a predetermined width and height.

18. A computing device configured to collect training data related to a branded phishing Uniform Resource Locator (URL), comprising:
 at least one processor;
 at least one data storage device coupled to the at least one processor;
 a network interface coupled to the at least one processor and to a computer network;
 a plurality of processes spawned by the at least one processor, the processes including processing logic for:
 retrieving, over a computer network, a phishing URL impersonating a brand from a source of URLs;
 fetching a final webpage referenced by the retrieved phishing URL;
 determining a main language of a textual content of the fetched final webpage;
 rendering at least one graphical representation of the fetched final webpage,
 extracting, from the source of URLs, information including the retrieved phishing URL, a brand associated with the retrieved phishing URL, a type associated with the retrieved phishing URL, a date associated with the retrieved phishing URL and storing the extracted information in a database over the computer network, together with the fetched final webpage, a determined main language of the fetched final webpage, and the rendered at least one graphical representations of the fetched final webpage;
 retrieving, from a source of messages, a message that contains a URL matching the retrieved phishing URL;
 determining a main language of a textual content of the retrieved message;
 rendering at least one graphical representation of the retrieved message;
 updating a record in a database with the message, the main language of the message, and the at least one rendered graphical representation of the retrieved message; and
 making the stored extracted information and the updated record accessible over the computer network at least as training data to train end users to recognize phishing websites and phishing messages.

19. The computing device of claim 18, wherein the processing logic for fetching the final webpage comprises processing logic to follow at least one redirection leading to the final webpage.

20. The computing device of claim 19, wherein the at least one redirection comprises at least one of an HTTP status code 3xx redirection, an HTML meta refresh redirection and a programming language redirection.

21. The computing device of claim 18, wherein at least one of the graphical representations of the fetched final webpage comprises metadata associated with the fetched final webpage.

22. The computing device of claim 21, wherein the metadata comprises a phishing URL.

23. The computing device of claim 18, wherein the graphical representations of the fetched final webpage comprise at least some of a graphical representation of the fetched final webpage on a mobile device, a graphical representation of the fetched final webpage on a tablet computer, a graphical representation of the fetched final webpage on a laptop computer and a graphical representation of the fetched final webpage on a desktop computer.

24. The computing device of claim 18, wherein each of the graphical representations of the fetched final webpage comprise a predetermined width and height.

25. The computing device of claim 18, wherein the retrieved message comprises one of an email, a text message and an instant message.

26. The computing device of claim 18, further comprising processing logic to at least one of parse, decode, decompress and decrypt a content of the retrieved message.

27. The computing device of claim 18, wherein the processing logic for matching the URL retrieved from the source of messages with the retrieved phishing URL requires an exact match.

28. The computing device of claim 18, wherein the processing logic for matching the URL retrieved from the source of messages with the retrieved phishing URL allows for fewer than all URL elements to match.

29. The computing device of claim 28, wherein the URL elements comprise at least one of a label of the domain name, an element of the path, an element of the query string and the fragment.

30. The computing device of claim 28, wherein processing logic for matching of the URL retrieved from the source of messages and the retrieved phishing URL is configured to be one of case sensitive and case insensitive.

31. The computing device of claim 18, wherein the graphical representations of the retrieved message comprise metadata associated with the retrieved message.

32. The computing device of claim 31, wherein the metadata of the retrieved message comprises at least one of a sender of the message, a date when the message was sent and a subject of the retrieved message.

33. The computing device of claim 18, wherein the graphical representations of the retrieved message comprise at least some of a graphical representation of the retrieved message on a mobile device, a graphical representation of the retrieved message on a tablet computer, a graphical representation of the retrieved message on a laptop computer and a graphical representation of the retrieved message on a desktop computer.

34. The computing device of claim 18, wherein each of the graphical representations of the retrieved message comprises a predetermined width and height.

\* \* \* \* \*